3,264,112
COMPOSITION FOR STIMULATING GROWTH OF DOMESTIC ANIMALS

Yutaka Kodama, Toyama-shi, Toyama, Tsutao Fujiwara, Tokyo, and Tatsumi Inagaki, Toyama-shi, Toyama, Japan, assignors to Toyama Kagaku Kogyo Kabushiki Kaisha, Chuoku, Tokyo, Japan, a corporation of Japan
No Drawing. Filed Jan. 24, 1963, Ser. No. 253,763
5 Claims. (Cl. 99—2)

This invention relates to an improved animal feed, particularly for the use of young domestic animals, in which is included poultry such as chicks, turkey poults, ducklings and the like. It is also useful for young cattle, horses, swine, dogs and sheep.

A considerable problem has been raised in accelerating the growth of young domestic animals, and also in protecting against diseases. The economic importance of a rapid growth rate is very great, especially in such rapid growing domestic animals such as poultry, for example chicks, turkey poults, ducklings and the like. The more rapid the growth, the greater the proportion of feed which is transformed into meat. It is also desirable to prevent diseases, for example, cocciodosis in chickens. For both of these purposes it has been proposed in the past to use various narrw-spectrum antibiotics such as penicillin, bacitracin, streptomycin, and broad-spectrum antibiotics such as tetracycline, oxytetracycline, or chloreteracycline and the like. When mixed with animal feeds in suitable amounts these compounds do in fact aid in weight gain under some circumstances, and the drugs also assist in protection against infection. However, there is always room for improvement and it is with such an improved animal feed that the present invention deals.

The present invention comprises an animal feed composition containing the conventional nutritionally balanced feed ingredients and an effective amount of a novel growth promoting additive as more particularly hereinafter defined. In addition, the animal feed composition may contain one or more of the useful broad-spectrum antibiotics chlortetracycline, tetracycline or oxytetracycline.

The novel additive is a bis-(5-nitrofurfurylidene)-acetoneguanylhydrazone and its addition salts such as the hydrochloride. The formula is as follows:

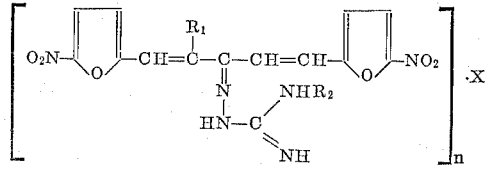

where $R_1$ is hydrogen, lower alkyl or halogen, $R_2$ is hydrogen or lower alkyl, and X is a mono-, di-, or tribasic acid, either inorganic or organic, $n$ is 1, 2, or 3 with the proviso that when X is monobasic $n$ is 1; when X is dibasic $n$ is 1 or 2; and when X is tribasic $n$ is 1, 2 or 3. The unsubstituted derivative in which $R_1$ and $R_2$ are hydrogen and X is chlorine is sold in the trade under the name "Panzon" and for simplicity in the remainder of this specification the short term will be used, it being understood that it is used only in the above meaning.

The additives to the feeds of the present invention may be used over a broad range, for example from about 5 to 500 p.p.m. Optimum results are obtained, particularly with chicks, at a concentration nearer 25 p.p.m.

The present invention may be considered from two aspects, one as an improved animal feed in which the Panazon or its derivatives is mixed with the feed in the proportions given above, or as a process of increasing the growth of young animals. When considered as a process the administration of the Panzon may be in an already prepared feed stuff as referred to above, or it is possible to mix it with the drinking water, for example, in the case of chicks. In such a case the amounts used should be comparable to those which would be ingested if the premixed feed were used.

It is an advantage of the present invention that in its optimum concentrations it shows a growth stimulating effect greater than the antibiotics which have been used in the past, and it is a further advantage that the drug need not be used alone as it is useable with antibiotics such as chlortetracycline and such combined mixed feeds are included within the scope of the present invention. It is also an advantage of the present invention that Panazon and its derivatives exert marked protection against certain infectious diseases such as coccidiosis in chickens, and thus combine both the desirable economic effect of enhancing growth rate and the protection against loss by disease.

The invention will be described in greater detail in conjunction with specific examples in which various amounts of Panazon are incorporated in various animal feeds.

EXAMPLE 1

A typical commercial feed was used having the following composition:

| Ingredient: | Percent |
|---|---|
| Ground yellow corn | 51.4 |
| Soybean oil meal solvent (44%) | 30.0 |
| Menhaden fish meal (60%) | 5.0 |
| Corn gluten meal (41%) | 5.0 |
| Dehydrated alfalfa meal (17%) (100,000A) | 2.0 |
| Stabilized fat | 4.0 |
| Dicalcium phosphate | 1.2 |
| Ground calcite limestone (33% Ca++) | 0.5 |
| Sodium chloride | 0.3 |
| Trace minerals (Delamix plus 2% $Z_n$++) | 0.1 |
| Vitamin-amino acid premix | 0.5 |

The diet alone was used as a control and various amounts of Panazon were added as were various amounts of procaine penicillin and chlortetracycline hydrochloride. In each group Peterson-cross broiler chicks were used, six males and six females per groups. Feed and water were supplied ad libitum. The results are shown in the following Table 1.

TABLE 1

| Supplement | Growth Response Percent of Control | | | |
| | Age in Weeks | | | |
| | 1 | 2 | 3 | 4 |
|---|---|---|---|---|
| Control | 100 | 100 | 100 | 100 |
| 100 p.p.m. Panazon | 118 | 109 | 109 | 106 |
| 100 p.p.m. Procaine Penicillin | 97 | 98 | 100 | 97 |
| 100 p.p.m. Chlortetracycline-hydrochloride | 109 | 104 | 103 | 100 |

It will be seen that at 100 p.p.m. Panazon gives better results at all periods than did either of the antibiotics.

EXAMPLE 2

The effect of varying amounts of Panazon and procaine penicillin was tested; the diet used in Example 1 was used as a control; and the drugs were added in separate tests in amounts of 12.5, 25, 50 and 100 p.p.m. The following table shows the results:

*Table 2*

| Compound | Age | Growth Response Percent of Control p.p.m. | | | | |
|---|---|---|---|---|---|---|
| | | 0 | 12.5 | 25 | 50 | 100 |
| Panazon | 1 week | 100 | 116 | 127 | 111 | 120 |
| | 2 weeks | 100 | 105 | 116 | 106 | 107 |
| | 3 weeks | 100 | 105 | 112 | 102 | 104 |
| | 4 weeks | 100 | 105 | 110 | 103 | 103 |
| Procaine Penicillin | 1 week | 100 | 111 | 119 | 107 | 131 |
| | 2 weeks | 100 | 100 | 107 | 103 | 116 |
| | 3 weeks | 100 | 97 | 103 | 102 | 105 |
| | 4 weeks | 100 | 98 | 101 | 103 | 104 |

It will be seen that the optimum amount of Panazon is about 25 p.p.m. and at this concentration there was markedly better results than with any concentrations of the antibiotics after four weeks. Even when 100 p.p.m. of Panazon is compared with penicillin at the same figure, their optimum, the results were not significantly different at the end of four weeks. In other words, Panazon is as effective as penicillin and in its preferred concentrations, which is lower, is more effective.

EXAMPLE 3

The procedure of Example 2 was followed, except that there was a control test and tests of each concentration of Panazon were of other concentrations of chlortetracycline hydrochloride. Table 3 shows the results, the control being designated as 100% as in Example 2.

*Table 3*

| | Age | Growth Response Percent of Control Panazon, p.p.m. | | | |
|---|---|---|---|---|---|
| | | 0 | 25 | 50 | 100 |
| Chlortetracycline-hydrochloride, p.p.m.: | | | | | |
| 0 | 1 week | 100 | 108 | 118 | 107 |
| | 2 weeks | 100 | 109 | 115 | 108 |
| | 3 weeks | 100 | 106 | 111 | 108 |
| | 4 weeks | 100 | 110 | 113 | 112 |
| 50 | 1 week | 114 | 123 | 111 | 115 |
| | 2 weeks | 106 | 115 | 108 | 110 |
| | 3 weeks | 103 | 110 | 106 | 108 |
| | 4 weeks | 106 | 111 | 111 | 111 |
| 100 | 1 week | 113 | 126 | 129 | 116 |
| | 2 weeks | 108 | 112 | 109 | 109 |
| | 3 weeks | 105 | 113 | 107 | 105 |
| | 4 weeks | 108 | 115 | 110 | 107 |
| 200 | 1 week | 110 | 109 | 101 | 113 |
| | 2 weeks | 106 | 111 | 101 | 109 |
| | 3 weeks | 103 | 108 | 100 | 107 |
| | 4 weeks | 106 | 112 | 106 | 111 |

It will be seen that the combined drugs gave useful results, and that Panazon was highly effective as a chick growth promoter. Statistical analysis of these data indicates that the chlortetracycline growth effect was augmented by the addition of Panazon. It appears that Panazon and chlortetracycline hydrochloride function differently in stimulating chick growth.

EXAMPLE 4

The following test was made to show that Panazon is also useful with other feeds. For this test a purified casein-sucrose feed was used having the following composition:

| Ingredient: | Percent |
|---|---|
| Sucrose | 60.4 |
| Casein | 20.0 |
| Gelatin | 8.0 |
| Calcium gluconate | 5.0 |
| Salt mixture No. 1 | 2.0 |
| Bone ash | 2.0 |
| Vitamins in cerelose | 1.0 |
| Cystine | 0.4 |
| Choline chloride | 0.2 |
| Vitamins A, D and E in corn oil | 1.0 |
| Folic acid mg./kg | 5 |
| Biotin mg./kg | 5 |
| Vitamin $B_{12}$ mcg./kg | 50 |

The following table shows the gain in weight as a percentage of the control:

*Table 4*

| Control (diet) | 100 | 100 | 100 | 100 |
|---|---|---|---|---|
| 100 p.p.m. Panazon | 154 | 136 | 127 | 108 |

EXAMPLE 5

The effectiveness of feeds containing Panazon in preventing infection was tested with four groups of 80 male Leghorn chicks. The standard diet was used and the feeding period was extended for nine weeks under conditions which did not involve any attempt to protect the chicks from coccidiosis infection. The large numbers in each group were used because the incidence of coccidiosis is not so high that one could be sure that there would be cases in a smaller group. The results appear in the following table:

*Table 5*

| Group | Number of symptomatic chicks | Period after treatment started (weeks) | | | | Total | Percent of symptomatic chicks |
|---|---|---|---|---|---|---|---|
| | | 3 | 5 | 7 | 9 | | |
| Control | | 0 | 1 | 2 | 0 | 3 | 3.75 |
| 10 p.p.m. | (80) | 0 | 0 | 0 | 0 | 0 | 0 |
| 20 p.p.m. | (80) | 0 | 0 | 0 | 0 | 0 | 0 |
| 40 p.p.m. | | 0 | 0 | 0 | 0 | 0 | 0 |

It will be seen that beginning at the fifth week the controls showed occurrence of coccidiosis, but the chicks which were fed the feeds with varying amounts of Panazon showed no cases. It is apparent, therefore, that substantial protection against infection is obtained.

We claim:

1. An animal feed for young domestic animals containing from 5 to 500 p.p.m. of a compound having the formula:

$$\left[ O_2N-\underset{O}{\bigcirc}-CH=C-\underset{\underset{HN}{\overset{N}{|}}}{\overset{R_1}{\underset{|}{C}}}-CH=CH-\underset{O}{\bigcirc}-NO_2 \right]_n X$$

in which $R_1$ is selected from a group consisting of hydrogen, lower alkyl and halogen, $R_2$ is selected from a group consisting of hydrogen and lower alkyl, X is selected from the group consisting of a mono-, di- and tribasic acid, and $n$ is a member of the group consisting of 1, 2, and 3 with the proviso that when X is monobasic $n$ is 1; when X is dibasic $n$ is selected from the group consisting of 1 and 2 when X is tribasic $n$ is selected from the group consisting of 1, 2 and 3.

2. A feed according to claim 1 which is a poultry feed.

3. An animal feed for young domestic animals containing from 10 to 100 p.p.m. of a compound having the formula:

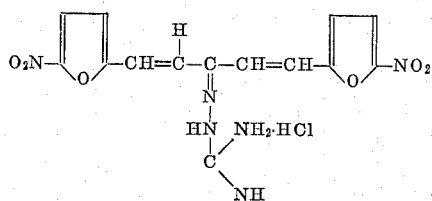

4. A feed according to claim 3 which is a poultry feed.

5. A feed according to claim 4 in which the amount of the compound is approximately 25 p.p.m.

References Cited by the Examiner

Ichimura: Chemical and Chemotherapeutical Studies on the Furan Derivatives, XXIX, J. of the Pharmaceutical Soc. of Japan, vol. 82, No. 11, pp. 1558–1560, November 1960.

Muira et al.: Chemical and Chemotherapeutical Studies on the Furan Derivatives, XXI, J. of the Pharmaceutical Soc. of Japan, vol. 81, pp. 1357–61 and 1372–74, 1961.

Kyoji et al.: Effect of the Administration of Panazon on the Growth of Chicken, Bulletin of the College of Agriculture and Veterinary Medicine, Nihon University No. 16, p. 1018, March 1963.

Vander Noot: Effect of Several Levels of Furazolidone in Swine Rations, J. of Animal Science, vol. 17, pp. 313–137, May 1958.

A. LOUIS MONACELL, *Primary Examiner.*

DANIEL J. DONOVAN, *Examiner.*